United States Patent [19]

Edison et al.

[11] B 3,916,018
[45] Oct. 28, 1975

[54] SEPARATION OF PARAXYLENE

[75] Inventors: Robert R. Edison, Olympia Fields; Thorpe Dresser, Markham, both of Ill.

[73] Assignee: Atlantic Richfield Company, Los Angeles, Calif.

[22] Filed: Mar. 26, 1973

[21] Appl. No.: 345,060

[44] Published under the Trial Voluntary Protest Program on January 28, 1975 as document no. B 345,060.

[52] U.S. Cl. ............................................. 260/674 A
[51] Int. Cl.² .......................................... C07C 7/14
[58] Field of Search ................................ 260/674 A

[56] References Cited
UNITED STATES PATENTS

| | | | |
|---|---|---|---|
| 2,823,241 | 2/1958 | Bennett et al. | 260/674 |
| 3,219,722 | 11/1965 | Jakob | 260/674 |
| 3,410,923 | 11/1968 | Strand et al. | 260/674 |
| 3,462,511 | 8/1969 | Edison | 260/674 |
| 3,662,013 | 5/1972 | Machell et al. | 260/674 |

*Primary Examiner*—Paul M. Coughlan, Jr.
*Assistant Examiner*—C. E. Spresser
*Attorney, Agent, or Firm*—John R. Ewbank

[57] ABSTRACT

A hydrocarbon stream consisting essentially of aromatic hydrocarbons of not more than 8 carbon atoms and containing at least 21 per cent paraxylene is cooled from ambient temperature through several stages to a temperature within the range from −50° to −75°C. to provide a slurry of paraxylene in a mother liquor. This slurry is subjected to separation procedures such as filtration to provide a primary filtrate and a crude filter cake comprising occluded liquid and solid paraxylene. The cooled primary filtrate is heat exchanged to cool the feedstock. The filter cake is treated during a brief period of less than two minutes in a cold washing zone, in which it is washed with a wash solvent such as toluene, constituting from about 20 per cent to about 95 percent of the weight of the cake; and the effluent solution of occluded liquid in wash solvent is withdrawn as secondary filtrate. The washed cake is melted and distilled to separate recyclable wash solvent from paraxylene. The purity of the paraxylene exceeds 99.2 per cent while still achieving acceptable yields. A combination of advantageously low capital costs and low operating costs are involved in this combination of single stage crystallization and controlled rapid flooding wash for achieving paraxylene having a purity of at least 99.2 per cent.

8 Claims, 1 Drawing Figure

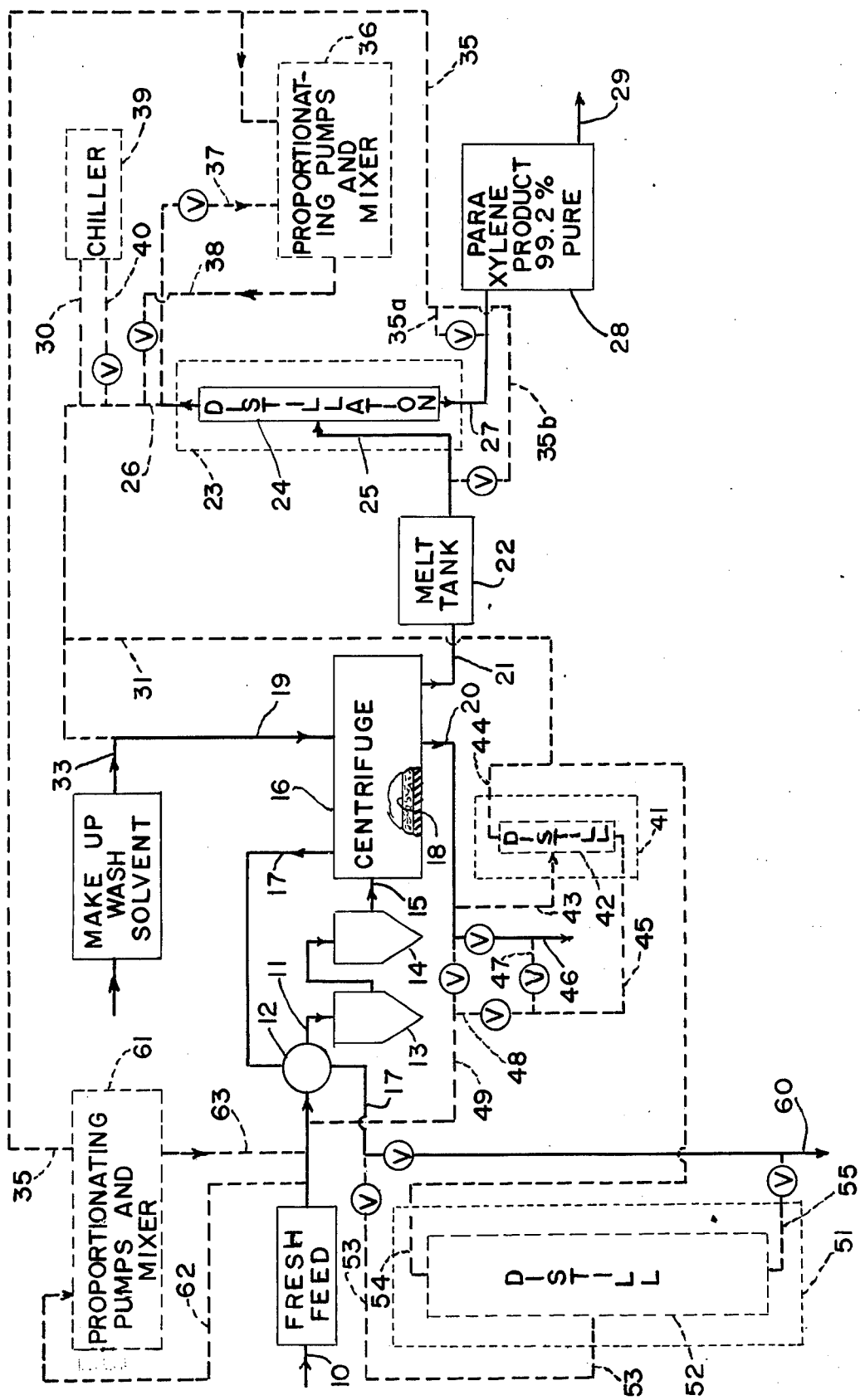

SEPARATION OF PARAXYLENE

FIELD OF THE INVENTION

This invention relates to separation from a $C_8$ aromatic hydrocarbon stream of paraxylene having a purity of at least 99.2 percent.

PRIOR ART

A plant for the cryogenic crystallization of paraxylene involves significant capital cost for the refrigerating equipment, for the crystallization stages, for the filtration and/or centrifuging stages and for the various other steps in the handling of the material. The handling costs, including costs of power and labor, vary from time to time and place to place. Significant differences exist concerning the feedstock available for processing. It is advantageous for a paraxylene production unit to be sufficiently flexible to adapt to the variations in feedstock which might occur throughout a period of a few decades.

A principal market for paraxylene is for the manufacture of terephthalic acid, used predominantly for making polymeric glycol terephthalate, used in producing filaments for fabrics, films, and other thermoplastic articles. Accordingly, purity specifications for the polyester plants influence the purity standards sought in a paraxylene plant. Different factories have at different times had different specifications concerning the minimum purity of paraxylene for terephthalic acid production, and there have been varying increments of prices for higher purities of paraxylene. The abundance of descriptions of methods for separating paraxylene from a $C_8$ aromatic stream does not permit the engineer to make an obvious application of previous suggestions for meeting the needs of a particular situation. Factors such as feedstock composition, labor costs, power costs, required purity of paraxylene product, and factory construction costs are involved in the complicated competition amongst methods for separating paraxylene from a $C_8$ aromatics stream.

In certain areas over certain periods, the demand for paraxylene having a purity greater than 99.8 percent dominated the plans for factory planning. In recent years in some parts of the world, there has been an increasing demand for paraxylene of a purity within a range from about 99.2 percent to about 99.75 percent, thus being significantly different from the price and/or demand for a minimum purity of 99.8 percent. The tolerance of larger amounts (e.g., four times as much in 99.2 percent specification product as in 99.8 percent specification product) of impurities has stimulated renewed interest in methods featuring only a single stage of crystallization, as distinguished from the multiple stages of crystallization generally desired for 99.8 percent specification product. It has been standard practice, in preparing paraxylene of more than 99.8 percent purity, to redissolve the first stage crystals and to recrystallize high purity paraxylene in a second stage of crystallization. Notwithstanding the abundance of literature and the continuing expansion and construction of paraxylene plants, no satisfactory answer to the problem of a low cost plant for production of 99.2 percent paraxylene has been available. Prior art methods and variations thereof are disclosed in Hoff et al., U.S. Pat. No. 2,795,634, Edison et al., U.S. Pat. Nos. 3,462,506, 3,462,509, 3,462,510, and 3,462,511, Dresser et al., U.S. Pat. No. 3,462,508, and Machell et al., U.S. Pat. No. 3,662,013.

SUMMARY OF THE INVENTION

In accordance with the present invention, a hydrocarbon stream consisting predominantly of aromatic hydrocarbons having not more than 8 carbon atoms, and containing at least 21 percent paraxylene, is subjected to refrigeration to form a slurry containing paraxylene, which is subjected to centrifuging or filtering to provide a crude filter cake containing paraxylene. A primary filtrate comprising mother liquor is withdrawn. The crude filter cake is thereafter treated during a very brief period of less than 2 minutes with wash solvent constituting from about 20 percent to about 95 percent of the weight of the paraxylene cake, and a secondary filtrate comprising most of the impurities in the crude filter cake is withdrawn from the thus washed filter cake. It is advantageous to employ the wash solvent so that there is a single flood washing step. A purified paraxylene cake having a purity of at least 99.2 percent paraxylene results from the combination of single stage crystallization and rapid solvent wash. The washed filter cake can be melted and distilled to separate high purity paraxylene from the wash solvent. In paraxylene crystallization, the primary filtrate (comprising mother liquor) generally weighs much more than the crude filter cake. Procedures are available for isomerizing xylene to form fractions containing additional paraxylene. Primary filtrate is sometimes sent directly, or after suitable purification, to an isomerization zone to prepare a recycle stream component of the feedstock. There are a variety of potentialities for recycling fractions through the crystallization zone without unmanageable problems of accumulation of impurities or loss of ultimate yield. Appropriate engineering choices can be made concerning recycling alternatives while still retaining the single stage crystallization procedure of the flow sheet.

Although the purity of recoverable paraxylene in the crude filter cake, as initially precipitated in a refrigerated $C_8$ aromatics slurry, is less than 95 percent, the simple step of a single stage of rapid flooding washing with a hydrocarbon solvent constituting 20 percent to 95 percent of the cake, permits preparation of a washed cake from which paraxylene of 99.2 percent or better purity can be recovered by melting and distilling such washed filter cake. The high yield (attributable in part to the relatively small proportion of wash solvent and in part to the rapidity of the flood washing and in part to preventing excessive leaching) provides cost advantages. Although second stage crystallization is generally necessary for attaining purities such as 99.8 percent from feedstocks containing conventional amounts of paraxylene, a less expensive factory is attainable by the single stage crystallization procedure of the present invention.

The wash solvent must be a hydrocarbon having a freezing point within the range from −130° to −75°C., whereby no freezing of the solvent occurs at centrifuge temperatures within the range from about −75°C. to about −50°C. Moreover, the wash solvent must have a boiling point above 35°C., desirably above 90°C., and below 115°C., whereby high purity paraxylene (bp 138.4) can be economically separated from the wash solvent in a distillation tower. Speed of displacement of occluded liquid in the crude filter cake is the most important characteristic of the wash solvent. The rate at which a solvent penetrates and dissolves the metaxylene and other components of the occluded liquid at centrifuge temperatures is not an equilibria phenomena because the washing is quickly completed before equilibrium might be reached. Selectivity for dissolving and displacing the mother liquor without dissolving paraxylene during the brief washing can be pertinent but propensities for rapid dissolving of paraxylene can be dealt with by saturating (for centrifuge temperatures) the solvent with paraxylene prior to injecting it onto the crude filter cake. Recovery of the wash solvent is ordinarily so complete and inexpensive, and the solvent inventory is such a small fraction of the plant investment, and solvent make-up costs increase the cost of each kilogram of product so little that the cost of the solvent is generally of trivial significance as contrasted with the great importance of its performance in maximizing the purity of the product.

Toluene has numerous advantages as the wash solvent, especially when the primary filtrate is recycled through an isomerization zone. Methyl cyclohexane has a lower boiling point than toluene and offers certain advantages. Isooctane dissolves small amounts of paraxylene at centrifuge temperatures and offers certain selectivity advantages. A naphtha fraction having a boiling point range of 90°–100°C. is cheaper than isooctane and is also selective. Other naphthas free from components crystallizable at −75°C. and having a boiling point within the 35°–115°C. range are operable because the amount of wash solvent is always less than the weight of the crude filter cake.

The numerous advantages of toluene as the wash solvent prompt its selection in a considerable number of paraxylene plants.

DESCRIPTION OF THE DRAWINGS

The substantially self-explanatory flow sheet schematically shows single stage crystallization of paraxylene with rapid flood washing of the crude filter cake.

FLOW SHEET DESCRIPTION

The process of the present invention is designed for crystallization of paraxylene at a temperature desirably about −63°C. and within the range from −50° to −75°C. The desirable results are obtainable only if the feed to the crystallizer contains at least 21 percent by weight paraxylene. Accordingly, the fresh feed entering by line 10 ordinarily has a paraxylene content greater than 21 percent. Certain optional possibilities are shown in dotted lines, including the availability of recycled secondary filtrate through line 49 and/or the recycling of paraxylene product through line 63. Suitable controls provide assurance that the temperature adjusted feedstock 11 to the first crystallizing tank 13 has the minimum 21 percent paraxylene content. The initial chilling of the feedstock may occur in a heat exchanger 12 by which a stream of primary filtrate 17 is warmed toward ambient temperature.

Each of the crystallizer tanks, including a first crystallizer 13 and a last crystallizer 14, as well as any intermediate crystallizers, are refrigerated for cooling the crystallizer feedstock 11 to the desired temperature, such as −63°C., and within the range from −50° to −75°C., thereby forming a slurry of crystals of paraxylene in a mother liquor consisting predominantly of a mixture of metaxylene, orthoxylene, and ethylbenzene. As noted hereinafter, the mother liquor may contain a small amount of wash solvent derived from a recirculated stream.

The effluent from the crystallizers flows by line 15 as a slurry of paraxylene crystals in a mother liquor to a continuous centrifuge 16, functioning as a filtration zone. A stream of primary filtrate 17 is withdrawn from the centrifuge 16, leaving a crude filter cake 18 at the periphery of the centrifuge.

Particular attention is directed to the careful control of the washing of the crude filter cake for the preparation of a highly purified filter cake. In accordance with the present invention, it is very important to avoid any prolonged leaching of the crude filter cake, inasmuch as any leaching action tends to decrease the yield of desired product without adequate purification of the crystals. The crude filter cake comprises solid paraxylene and occluded liquid, the occluded liquid consisting predominantly of metaxylene, but comprising ethylbenzene, orthoxylene, liquid paraxylene and possibly small amounts of recycled wash solvent. The boiling point of ortho, meta, and paraxylene and ethylbenzene are sufficiently close together that recovery of paraxylene merely by distillation of such a xylene mixture is not economically attractive. However, by almost instantly displacing the occluded liquid of the crude filter cake with a lower boiling solvent having a sufficiently low freezing point, the attractiveness of the subsequent distillation step is enhanced, whereby purified paraxylene can be separated from such washed filter cake by a distillation step having a sufficiently low cost and simplicity to be commercially attractive.

In order to avoid the leaching action, the wash liquid must be applied during a brief period of less than 2 minutes and the quantity of wash liquid must be restricted to less than 95 percent by weight of the crude filter cake. In order for the washing of the crude filter cake 18 with the solvent to be effective in substantially completely displacing the metaxylene, the minimum quantity of the wash liquid must be greater than the amount of occluded liquid in the filter cake and must be at least 20 percent by weight of the crude filter cake 18. As shown in the flow diagram, the washing solvent is injected as a flooding wash at 19; and the secondary filtrate is withdrawn at line 20. It is important that the washing step be controlled to achieve quickly the substantially complete displacement of the initially occluded liquid, whereby the washed filter cake contains occluded liquid consisting predominantly of the wash solvent. Controlling the washing step to be very quick is also essential in minimizing the leaching of the paraxylene crystals by the wash solvent. In preferred embodiments, the contact time of the wash solvent and filter cake is less than about 5 seconds. Using a centrifuge and estimates of the volume of crude filter cake, beneficial washings can be achieved at flow rates corresponding to contact times of a small fraction of a second. To achieve the 99.2 percent minimum purity by the present invention, however, it is ordinarily advantageous to control the contact time to be at least 1 second.

After the paraxylene crystals have been quickly washed, they are discharged through line 21. It is important that the temperature of product line 21 be not more than 40°C. warmer than the crude cake 18 and/or primary filtrate 17, but the product temperature is ordinarily slightly (e.g., 5° or 1°C.) warmer than the primary filtrate 17. The product stream 21 is melted in a melt tank 22 and the resulting liquid is directed to a distillation zone 23 characterized by a distillation column 24. The feed from the melt tank 22 enters distillation column 24 through line 25 and in the column 24 the hydrocarbons are distilled to separate an overhead 26 from a bottoms stream 27 directed to a product surge zone 28 and thence to product discharge line 29. It is important that the single stage paraxylene process provide a product having a minimum purity of 99.2 percent.

Various optional features can be utilized under appropriate circumstances when desired. It is usually advantageous to recycle the wash solvent recovered through overhead line 26 which can be mixed with make-up wash solvent entering through line 33 and optionally, when desired, miscellaneous recycled wash solvents entering through line 31 to provide a supply line 19 of wash solvent.

The important function of the wash solvent is to rapidly displace the occluded liquid in the crude filter cake 18 by a solvent having a boiling point sufficiently low to permit cheap separation thereof in column 24. Any wash solvent having the rapid speed of displacement also has the disadvantage of dissolving significant amounts of paraxylene at the centrifuge temperature of about −63°C. For example, when toluene is the wash solvent and the centrifuge temperature is about −63°C., the solubility of paraxylene in toluene at about −63°C. is about 10 percent.

If desired, the wash solvent can be modified to include an amount of paraxylene corresponding essentially to the amount soluble at the centrifuge temperature. Liquid paraxylene can be recycled through line 35 (from line 25 through line 35b or from line 27 through line 35a) to a mixer 36 comprising proportionating pumps and mixing means. When such mixer 36 is employed, a wash solvent stream such as line 26 is directed through line 37 to the proportionating pump of the mixer 36 and the recycled paraxylene liquid is pumped from line 35 to the proportionating pump, whereby the effluent 38 from the mixer 36 consists of the solvent containing an amount of paraxylene corresponding essentially to the solubility of paraxylene in such wash solvent at the centrifuge temperature. Alternatively, distillation column 24 may be operated so that the overhead stream contains the desired concentration of paraxylene. Mixer 36 provides a schematic flow sheet representation of washing the crude filter cake with solvent containing either none or some paraxylene and should be interpreted as a schematic showing of an alternative method rather than as a mandatory equipment requirement.

It is essential that the wash solvent be kept below 40°C. However, inasmuch as the paraxylene recovery plant is generally at an ambient temperature less than 40°C., this limitation is not unduly troublesome. If only a very small amount such as 20 percent of wash solvent is employed, a relatively high temperature for wash solvent is tolerable without excessive leaching of paraxylene crystals. When relatively larger amounts of wash solvent are employed, and/or when the washing step employs longer than minimum contact time, then the maintenance of a lower temperature for the wash solvent is more advantageous. A chiller 39 can cool a suitable stream of wash solvent to a temperature which is between 40°C. and a temperature about 5° warmer than the crude filter cake 18. The wash solvent thus has a temperature within the range from −70° to 40°C. but is often from 5° to about 95°C. warmer than the crude filter cake but can be even colder than such cake. In preferred embodiments, the wash solvent is chilled to a temperataure range from −70° to −10°C. When the chiller 39 is employed, the warm solvent may enter through line 40 and the cooled solvent may leave through line 30 for reentry into the appropriate wash solvent stream.

The washing step tends to increase the temperature of the filter cake so that the withdrawn filter cake at stream 21 is at least 1°C. warmer than the crude filter cake 18. The quantity of solvent, the temperature of the solvent, and the speed of the washing are all regulated for effectively controlling such temperature increase within the limits from 1° to 40°C. of differential temperature.

The secondary filtrate may be directed to a by-product withdrawal line 46, which may be desirable when the solvent is selected to have a minimized solubility for paraxylene and when such by-product is scheduled for mixing with other hydrocarbons for marketing as gasoline. If the wash solvent dissolves a significant amount of paraxylene, as does toluene, and if the fresh feed contains a sufficiently high concentration of paraxylene to permit simple recycling of the secondary filtrate, then the unmodified secondary filtrate may be recycled by line 49 for admixture with fresh feed line 10.

If desired, a distillation zone 41 may be provided for the secondary filtrate. A distillation column 42 can process the secondary filtrate entering by line 43 to provide a stream of recycled wash solvent 44 and a flashed secondary filtrate 45. The flashed secondary filtrate from the bottom of the distillation tower 42 can be directed either by line 47 to by-product discharge line 46 or by line 48 to the secondary filtrate recirculation line 49.

Certain advantages arise from including in the feed line 11 to the crystallizers an amount of wash solvent attributable approximately to the amount of solvent in the secondary filtrate. The ease with which the paraxylene crystals form and the ease with which the occluded liquid is rapidly washed from the crude filter cake is greater when the minor amount of wash solvent is present. The effectiveness of the rapid flood washing step is attributable not to equilibria phenomena but to displacement rate phenomena.

Small differences in viscosity of the occluded liquid modify the speed with which it is displaced by the wash solvent. The temperature in crystallizers 13, 14 and centrifuge 16 can be lower when secondary filtrate is recirculated, and such lower temperature permits recovery of a larger portion of the paraxylene in the centrifuge. There are a variety of reasons why advantages accrue from recirculating the unmodified secondary filtrate instead of utilizing the distillation zone 41. However, the presence of wash solvent in the primary filtrate in line 17 restricts the utility thereof. Hence, it is sometimes desirable to provide a distillation zone 51 for the primary filtrate. It is surprising that advantages could arise from the provision of a distillation zone 51 for recovery of solvent wash from a very much larger quantity of high boiling material than would be processed in distillation zone 41. Such large capacity distillation zone 51 has its advantages, not in minimized cost of recovery of the wash solvent component of the secondary filtrate, but in the superior operation of the centrifuge in maximizing the recovery of high purity paraxylene crystals after single stage crystallization. When a separate isomerization zone is employed and toluene is the wash solvent, the toluene can be recovered from the isomerizate, so that distillation zone 51 should be interpreted as the schematic showing of a step of solvent recovery rather than a mandatory requirement for a column at a specific location.

The distillation zone 51 includes a distillation tower 52. The primary filtrate 17 enters the distillation tower 52 through line 53, providing an overhead stream 54 of recycled wash solvent and a bottoms stream 55 which can be designated as flashed primary filtrate, which can be directed to the primary filtrate by-product withdrawal line 60. The recovered wash solvent from line 44 of distillation zone 41 and/or line 54 of distillation zone 51 is directed to line 31 for admixture with the recovered solvent from line 26 of distillation zone 23.

A mixer 61 comprises proportionating pumps and mixing means for adding recycled paraxylene in line 35 to withdrawn feed in line 62 to provide enriched feed stream 63 reentering feed stream 10. Ordinarily, the feedstock is selected to contain at least 21 percent paraxylene, thus eliminating any necessity for mixer 61.

The wash solvent must be a hydrocarbon having a boiling point which is not higher than 115°C. by reason of the importance of separating the wash solvent from high purity product in distillation tower 24 at a manageable cost. The boiling point of the solvent must be above 35°C. and should desirably be above 90°C. Of even greater importance than the boiling point of the wash solvent is the freezing point which must be significantly below the centrifuge temperature and should be within a range from −130° to −60°C. The wash solvent must be a hydrocarbon which does not interfere with the crystallization of the paraxylene or the recovery of pure paraxylene in the distillation tower 24.

Among the hydrocarbons which are suitable as wash solvents may be mentioned toluene, which, because it is an aromatic hydrocarbon having a structure similar to xylene, is particularly advantageous. Moreover, the presence of the toluene in the by-product stream and/or the mechanical losses of the recirculating wash solvent are not unduly troublesome when employing toluene as the wash solvent.

Cyclopentane, methylcyclohexane, alkyl substituted cycloalkanes and mixtures thereof having desired freezing points below −60°C. and boiling points in the range of from 35° to 115°C. "Isooctane" comprising either a major proportion of 2,2,4-Trimethylpentane and its associated isomers, or alkylate, and naptha fractions boiling between 90° and 100°C. can also be employed. Other hydrocarbons, pure or mixed, complying with the requirements of freezing point in the −60° to −130°C. range and boiling points in the 35° to 115°C. range are also suitable, but generally less preferred than the hydrocarbons identified as $CH_3C_6H_5$, $CH_3C_6H_{11}$, $C_8H_{18}$ and $C_7-C_8HC$, having boiling points of from about 90° to 100°C.

Completeness and speed of displacement of the occluded liquid in the crude filter cake is the goal of the brief flooding wash. The temperature, proportion of wash solvent, presence or absence of recycled paraxylene, and related factors can be modified in achieving high purity product at minimized cost. The efficiency of recovery of wash solvent is generally great enough that the cost per gallon of the wash solvent is generally not the critical factor in selecting a wash solvent.

DESCRIPTION OF EMBODIMENTS

Example 1

A fresh feed containing 18 percent paraxylene and the balance usually predominantly metaxylene is introduced through line 10 and directed through line 62 to a proportionating pump. Liquid paraxylene is recycled through line 35 to mixer 61 whereby the paraxylene content of the adjusted feed is increased to 23 percent. Such adjusted feed from line 63 is mixed with recycled secondary filtrate from line 49 and directed to heat exchanger 12. The temperature adjusted xylene stream in line 11 is directed to a series of crystallizers 13, 14 to provide a slurry discharge through line 15 consisting of solid paraxylene crystals dispersed in a mother liquor consisting predominantly of metaxylene and including a minor amount of ortho xylene, a minor amount of ethylbenzene, and a minor amount of toluene. Such toluene is attributable to the recirculation of toluene from the secondary filtrate.

Such slurry is directed to centrifuge 16, in which the mother liquor is withdrawn as primary filtrate through line 17 and the crude filter cake 18 advances to a washing zone in the centrifuge. The crude filter cake 18 comprises paraxylene crystals and about 16 percent by weight occluded mother liquor. The temporary flooding of the filter cake by the wash liquid 19 injected onto a short zone of the advancing cake is regulated to be of brief duration. Using toluene corresponding to about 25 percent of the weight of the crude filter cake, such wash solvent instantly floods the filter cake and instantly dissolves the mother liquor. The solution of the mother liquor in the wash solvent is instantly removed as the initial portion of the secondary filtrate is withdrawn through line 20. The flooding of the cake with the wash solvent is so rapid that there is no opportunity for significant leaching of the paraxylene crystals by the wash solvent. After such rapid washing, the occluded liquid in the washed cake is predominantly toluene with only minor amounts of the metaxylene which initially dominated the occluded liquid in the crude filter cake.

Primary filtrate 17 is withdrawn at −60°C., about 3° warmer than the slurry supplied by line 15. The secondary filtrate line 20 is withdrawn at a temperature of −52°C. or about 8° warmer than the primary filtrate. Such warming is attributable to the fact that the toluene is cooled, not to the −63° of line 15, but only to about 0°C., whereby the relatively warm solvent rapidly displaces the occluded mother liquor. The warm solvent contacts the paraxylene crystals for much too brief a time to permit equilibria for either solubility or temperature characteristics. The washed filter cake is withdrawn through line 21 and directed to a melt tank 22. The liquid mixture of paraxylene and wash solvent flows through line 25 from the melt tank to the distillation tower 24. The toluene is distilled overhead through line 26 and the product xylene is withdrawn through bottom line 27 and advanced through surge zone 28 to product withdrawal line 29. Particular attention is directed to the fact that the paraxylene product has a purity greater than 99.2 percent, notwithstanding the utilization of only a single stage of paraxylene crystallization.

A recycled product stream can be directed through line 35b from line 25 and/or from product line 27 through line 35a. The recycled paraxylene may go through line 35 to mixer 36 and to mixer 61. The flow sheet shows paraxylene recycle stream 35 as a dotted line because such alternatives are optional expedients to respond to particular circumstances and not mandatory for single stage crystallization of paraxylene.

The recovered toluene in line 26 may, if desired, be directed through line 37 to the mixer 36 for the preparation of a solution containing about 9 percent paraxylene, withdrawn as line 38 and returned to wash solvent recycle line 26. A chiller 39 is adapted to cool a stream of wash solvent, which can enter through inlet line 40 and return by effluent line 30 to the wash solvent recycle line 26. The recovered wash solvent from distillation zone 41 and/or distillation zone 51 is directed through line 31 to wash solvent recycle line 26. Toluene is added as make-up wash solvent through line 33. A distillation zone 41, including a distillation tower 42, can be supplied with secondary filtrate through line 43, thereby providing recirculated solvent through overhead line 44 and recycle lines 31 and 26 successively.

Example 2

A fresh feed containing 24 percent paraxylene is supplied through line 10. No recycled paraxylene is injected, so the mixer 61 is not utilized. Secondary filtrate is recirculated from line 49, such filtrate comprising the wash solvent and $C_8$ aromatic hydrocarbons. The adjusted feedstock is directed through the heat exchanger and follows a process generally like that of Example 1, except for variations related to the use of methylcyclohexane as the wash solvent. Both the mixer 36 and chiller 39 are employed, so that the wash solvent introduced at 19 contains an amount of paraxylene corresponding essentially to the solubility of paraxylene in methylcyclohexane at centrifuge temperature. The centrifuge is maintained at about −63°C. The solution of wash solvent is chilled to about −30° before being injected into the centrifuge at 19. The amount of methycyclohexane employed as wash solvent is approximately 50 percent by weight of the crude filter cake withdrawal rate through line 21. Methylcyclohexane has greater selectivity for extracting metaxylene without leaching paraxylene from the filter cake. Such selectivity is attributable to the rate or rapidity with which the mother liquor, comprising large amounts of metaxylene, is dissolved in the wash solvent. The methylcyclohexane is recovered quite satisfactorily in both distillation tower 24 and in distillation tower 52. A paraxylene product of commercial purity is withdrawn through line 29.

Example 3

"Isooctane" is employed as the wash solvent instead of methylcyclohexane, and the injection rate at 19 corresponds essentially to 70 percent of the product withdrawal rate at line 21. In other respects, the procedure of Example 2 is followed. "Isooctane" has less propensity toward leaching paraxylene crystals, thus permitting the use of a larger proportion of wash solvent during the extremely brief washing of the crude filter cake. A product of commercial purity is withdrawn through line 29. Commercial alkylate represents a technical grade of "Isooctane" suitable for this purpose.

Example 4

A naphtha having a boiling point range from 90° to 100°C., and generally free from aromatic hydrocarbons and filtered at −130°C. to eliminate any readily freezable components is utilized as the wash solvent. The solvent is chilled to −50°C., and no paraxylene is recycled therewith. Such chilled solvent is employed at a rate corresponding to 75 percent of the cake withdrawal rate through line 21, and the secondary filtrate is recirculated through line 49. The naphtha is recovered in distillation column 52 and recirculated through lines 54 and 31. Careful operation of column 52 is important when the paraxylene unit is integrated with an isomerization unit for converting mother liquor of lines 55 and 60 to an isomerizate suitable for inclusion in fresh feed 10. Excessive amounts of non-aromatics can increase coke formation rates in the isomerization zone unlee substantially all of the naphtha is removed in column 52. A commercially pure paraxylene is withdrawn through product line 29.

Examples 5–8

A stream of $C_8$ aromatic hydrocarbons consisting of orthoxylene, metaxylene, ethyl benzene and paraxylene, and containing about 23 percent paraxylene was cooled to about −62°C. to provide a slurry of paraxylene in a mother liquor. The slurry was transferred to a filter maintained at about −62°C. and the mother liquor was withdrawn from a crude paraxylene filter cake. Vacuum treatment of the crude filter cake decreases the wetness of the filter cake to within a range from about 7 percent to about 10 percent by weight.

In accordance with the present invention, such filter cake was treated with toluene which is merely approximately adequate to flood the cake and fill all of the interstices of the filter cake without maintaining a liquid level significantly higher than the cake level, such amount being with the range from 20 percent to 95 percent of the initial weight of the filter cake desirably less than 50 percent. Important advantages are achieved because only a washing step is involved without the mechanical agitation involved in re-slurrying the paraxylene crystals in a solvent.

The range of weight of solvent for a merely flooding solvent wash is from 20 percent to 95 percent to accommodate not only the variations in porosity of filter cake but also variations in equipment in which the washing step is conducted. It is highly desirable to minimize sequential leaching, channeling and related features of solvent extraction and to maximize purification attributable to plug flow of solvent. The holding time of the flooded mixture of filter cake and toluene should be less than 2 minutes, and may be as short as about a second when a centrifuge is used. By making the controlled amount of toluene wash available during a period as brief as practicable, the flooding or plug flow (as distinguished from sequential leaching) type of washing is promoted.

When using a laboratory type of filter, no vacuum was applied until the end of the holding period. The single batch of toluene was distributed uniformly across the top of the filter cake so that the flow of the wash through the filter cake can be conveniently described as plug flow. At about −62°C., toluene dissolves about 10 percent paraxylene. The yield of purified filter cake is decreased by about 1 percent for each 10 percent by weight of solvent above the minimum flooding batch and the 95 percent maximum should not be exceeded even when toluene flow conditions achieve less than a complete flooding of the cake.

The data relating to four cryo-purifications of paraxylene are shown in Table I.

Table I

Single batch wash of single crystallization

| | | | | Weight per cent paraxylene in cake | | | |
|---|---|---|---|---|---|---|---|
| | | | | | purity after toluene | Yield based on | |
| example | per cent paraxylene in feed | crystallization temp. °C. | per cent toluene wash | before toluene wash | wash and toluene removal | initial cake | initial paraxylene |
| 5 | 24.92 | −57 | 42 | 92.7 | 99.63 | 92 | 100 |
| 6 | 23.73 | −60 | 40 | 92.77 | 99.6 | 84 | 91 |
| 7 | 22.6 | −62 | 46 | 92.7 | 99.59 | 85 | 93 |
| | 21.8 | −63 | 26 | 92.7 | 99.42 | 92 | 94 |

8

Such data show that an advantageously high purity is attainable by the single batch flood washing of the filter cake while still achieving an attractive yield. Such single stage crystallization eliminates the expensive equipment related to remelting, recrystallizing, and refiltering the paraxylene, as is necessary when a product purity such as 99.8 percent is desired.

It is possible to distill the second filtrate to recover the toluene wash solvent. The $C_8$ aromatic raffinate from the washing step may be marketed as a technical grade of xylene, or it may be directed to an isomerization zone or otherwise utilized. If the secondary filtrate is recycled to the feed, then the toluene is predominantly discharged from cryogenic zones by discharge as a minor part of the primary filtrate.

In a control, following the same general procedure as described, but merely repeating a 47 percent wash four times, so that the amount of toluene used for washing the filter cake was increased to 188 percent, the yield was reduced to 49 percent of the 87.18 percent pure cake and to 53 percent of the paraxylene content of the cake. Such losses of yield were attributable to the leaching of the paraxylene from the crude filter cake by the use of excessive contact time and excess toluene. The purity of such product was only 99.74 percent, below the 99.8 percent requirement of some customers. A series of controls of this nature established the importance of minimizing the amount of toluene employed for conveniently achieving the practical flooding type of wash and established the 95 percent maximum.

In recovering the toluene wash solvent by distillation, certain technical advantages arise from controlling the distillate composition so that it contains about 10 percent paraxylene. Similarly, a toluene wash solvent can be prepared to contain 10 percent paraxylene. When the toluene wash solvent contains about 10 percent paraxylene, higher yields are attainable then when using pure toluene for the wash while still removing impurities rapidly and effectively.

Until the completion of the toluene wash, the paraxylene cake must be maintained at a temperature in the range from −50° to −75°C. to achieve the advantageous results of the present invention. The temperature of the toluene wash solvent (with or without dissolved paraxylene) must be maintained with the range from −70° to 40°C. to achieve the advantageous results of the present invention. Even with toluene as hot as 40°C., a minimal flooding wash can be conducted while keeping the temperature of the cold cake below −50°C. The amount of the toluene is both less than 95 percent by weight of the paraxylene cake and sufficiently limited for preserving the cake temperature below −50°C.

By a series of tests it is established that the amount of toluene employed for the flooding batch wash should be from 20 percent to 95 percent of the cake, and that the initial feed should contain at least 21 percent paraxylene, and that such washing is advantageous for single stage methods requiring purities greater than 99.2 percent but less than 99.8 percent paraxylene.

Various modifications of the invention are possible without departing from the scope of the appended claims.

We claim:

1. In the method in which a liquid feedstock comprising paraxylene is cooled to crystallize paraxylene and to form a slurry of liquid and paraxylene crystals and such slurry is processed to separate a paraxylene crude filter cake, and in which such crude filter cake is thereafter processed to obtain paraxylene of commercial purity, the improvement which comprises:

controlling the feedstock composition to contain at least 21 percent paraxylene, and most of the balance being $C_8$ aromatic hydrocarbons;

maintaining the filter cake at a temperature within the range from −75° to −50°C. throughout the purification process;

subjecting the filter cake to flooding washing with hydrocarbon solvent having a freezing point within a range from −130° to −60°C. and a boiling point within the range from 90° to 115°C., said solvent constituting from 20 percent to 95 percent of the initial weight of the filter cake, said solvent having an initial temperature within the range from −70° to 40°C., the filtrate being withdrawn from the thus purified filter cake, said flooding washing being accomplished quickly with wash solvent-cake contact time of less than 2 minutes; and recovering paraxylene having a purity of at least 99.2 percent by melting and distilling such purified cake from single stage crystallization of paraxylene.

2. The method of claim 1 in which both the initial temperature of the wash solvent and the effluent temperature of the wash solvent is within the range from about −70° to about −10° C.

3. The method of claim 2 in which the wash solvent is toluene.

4. The method of claim 1 in which the contact time is within the range from about 1 to about 5 seconds.

5. The method of claim 2 in which the wash solvent is selected from cyclopentane, methylcyclohexane, alkyl substituted cycloalkanes and mixtures thereof.

6. The method of claim 2 in which the wash solvent is selected from 2,2,4-Trimethylpentane, 2,2,3-Trimethylpentane, 2,3,4-Trimethylpentane and mixtures thereof.

7. The method of claim 2 in which the wash solvent is selected from naphtha and alkylate fractions boiling in the range of about 90° to 100°C.

8. In the method in which a liquid feedstock comprising paraxylene is cooled to crystallize paraxylene and to form a slurry of liquid and paraxylene crystals and such slurry is processed to separate a paraxylene crude filter cake, and in which such crude filter cake is thereafter process to obtain paraxylene of commercial purity, the improvement which comprises:

controlling the feedstock composition to contain at least 21 percent paraxylene, and most of the balance being $C_8$ aromatic hydrocarbons;

maintaining the filter cake at a temperature within the range from −75° to −50°C. throughout the purification process;

subjecting the filter cake to flooding washing with toluene having an initial temperature within the range from −70° to 40°C., the filtrate being withdrawn from the thus purified filter cake, said flooding washing being accomplished quickly with wash solvent-cake contact time within the range from about 1 to about 5 seconds; and recovering paraxylene having a purity of at least 99.2 percent by melting and distilling such purified cake from single stage crystallization of paraxylene.

* * * * *